US010266413B2

(12) United States Patent
Adamson et al.

(10) Patent No.: US 10,266,413 B2
(45) Date of Patent: Apr. 23, 2019

(54) FRACTIONATION OF GRAPHENE OXIDE THROUGH EMULSION STABILIZATION AND GRAPHENE OXIDE PRODUCED THEREBY

(71) Applicant: University of Connecticut, Farmington, CT (US)

(72) Inventors: Douglas H. Adamson, Mansfield Center, CT (US); Harish Kumar, Bethel, CT (US)

(73) Assignee: University of Connecticut, Farmington, CT (US)

(*) Notice: Subject to any disclaimer, the term of this patent is extended or adjusted under 35 U.S.C. 154(b) by 0 days.

(21) Appl. No.: 15/802,733

(22) Filed: Nov. 3, 2017

(65) Prior Publication Data

US 2018/0127275 A1 May 10, 2018

Related U.S. Application Data

(60) Provisional application No. 62/417,717, filed on Nov. 4, 2016.

(51) Int. Cl.

| | |
|---|---|
| ***C01B 32/192*** | (2017.01) |
| ***C01B 32/23*** | (2017.01) |
| ***B01D 67/00*** | (2006.01) |
| ***B82Y 30/00*** | (2011.01) |
| ***C01B 32/198*** | (2017.01) |

(52) U.S. Cl.

CPC ........ *C01B 32/192* (2017.08); *B01D 67/0093* (2013.01); *B82Y 30/00* (2013.01); *C01B 32/198* (2017.08); *C01B 32/23* (2017.08); *C01B 2204/02* (2013.01); *C01B 2204/32* (2013.01)

(58) Field of Classification Search

CPC ..... C01B 32/192; C01B 32/198; C01B 32/23; C01B 2204/02; C01B 2204/32; B82Y 30/00; B01D 67/0093

See application file for complete search history.

(56) References Cited

FOREIGN PATENT DOCUMENTS

CN 103768960 A * 5/2014

OTHER PUBLICATIONS

Kumar, Harish V., Steven J. Woltornist, and Douglas H. Adamson. "Fractionation and characterization of graphene oxide by oxidation extent through emulsion stabilization." Carbon 98 (2016): 491-495.*

(Continued)

*Primary Examiner* — Richard M Rump

(74) *Attorney, Agent, or Firm* — McCarter & English, LLP

(57) ABSTRACT

A method to fractionate and isolate components of oxidized graphene material is provided that includes fractionating a system that includes graphene oxide, a solvent and water, wherein the fractionation creates two phases or fractions: (i) a water phase or fraction that contains highly oxidized graphene oxide, and (ii) a solvent-in-water emulsion phase or fraction that contains a graphene-based material. The graphene-based material is recovered from the solvent-in-water phase or fraction. Fractionation of the solvent-in-water emulsion phase or fraction may be repeated. The graphene-based material (uGO) may be used in a range of applications, e.g., a medical device, a nanoelectronic, an electromechanical system, a sensor, a composite, a catalysis, and energy storage device, and an optics application.

9 Claims, 9 Drawing Sheets

1-step Fractionation (fr)

GOx fr = >

(GOx)e (GOx)w

(56) References Cited

OTHER PUBLICATIONS

Kim, Franklin, Laura J. Cote, and Jiaxing Huang. "Graphene Oxide: Surface Activity and Two-Dimensional Assembly." Advanced Materials 22.17 (2010): 1954-1958.*
Chen, Fuming, et al. "Ethanol-assisted graphene oxide-based thin film formation at pentane-water interface." Langmuir 27.15 (2011): 9174-9181.*
Kim, Jaemyung, et al. "Graphene oxide sheets at interfaces." Journal of the American Chemical Society 132.23 (2010): 8180-8186.*
B.C. Brodie, F.R.S., On the atomic weight of graphite, Philosophical Transactions, 1859 vol. 149.
William S. Hummers, Jr. et al., Preparation of Graphitic Oxide, The National Lead Company Fellowship at the Mellon Institute of Industrial Research, 1958.
C. Hontoria-Lucas, et al., Study of Oxygen-Containing Groups in a Series of Graphite Oxides: Physical and Chemical Characterization, Carbon, Jun. 1995 vol. 33, No. 11, Elsevier Science Ltd.
Anton Lerf, et al., Structure of Graphite Oxide Revisited, J. Phys. Chem. B., 1998 vol. 102 No. 23.
A.C. Ferrari, et al., Raman Spectrum of Graphene and Graphene Layers, Phys. Rev. Lett., Nov. 3, 2006, vol. 97, The American Physical Society.
Tamas Szabo, et al., Evolution of Surface Functional Groups in a Series of Progressively Oxidized Graphite Oxides, Chem. Mater., 2006 vol. 18 No. 11.
Inhwa Jung, et al., Tunable Electrical Conductivity of Individual Graphene Oxide Sheets Reduced at "Low" Temperatures, Nano Lett., 2008 vol. 8, No. 12, American Chemical Society.
Jeremy T. Robinson, et al., Reduced Graphene Oxide Molecular Sensors, Nano Lett., 2008 vol. 8 No. 10, American Chemical Society.
Jeremy T. Robinson, et al., Wafer-scale Reduced Graphene Oxide Films for Nanomechanical Devices, Nano Lett., 2008 vol. 8 No. 10, American Chemical Society.
Keun Soon Kim, et al., Large-scale pattern growth of graphene films for stretchable transparent electrodes, Nature, Feb. 5, 2009, vol. 457, Macmillan Publishers Limited.
Cristina Gomez-Navarro, et al., Atomic Structure of Reduced Graphene Oxide, Nano Letters, 2010, American Chemical Society.
Daniela C. Marcano, et al., Improved Synthesis of Graphene Oxide, American Chemical Society, 2010.
Jaemyung Kim, et al., Graphene Oxide Sheets at Interfaces, J.Am. Chem.Soc., Apr. 1, 2010, vol. 132, American Chemical Society.
Karl W. Putz, et al., High-Nanofiller-Content Graphene Oxide-Polymer Nanocomposites via Vacuum-Assisted Self-Assembly, Adv. Funct. Mater. 2010, vol. 20, Wiley-VCH Verlag GmbH &Co. KGaA, Weinheim.
Kian Ping Loh, et al., Graphene oxide as a chemically tunable platform for optical applications, Nature Chemistry, 2010 vol. 2, Macmillan Publishers Limited.
M. Acik, et al., Unusual infrared-absorption mechanism in thermally reduced graphene oxide, Nature Materials, Oct. 2010, vol. 9, Macmillan Publishers Limited.
Samia Mahouche Chergui, et al., Uptake of copper ions by carbon fiber/polymer hybrids prepared by tandem diazonium salt chemistry and in situ atom transfer radical polymerization,Carbon, 2010 vol. 48, Elsevier Ltd.
Yonglai Zhang, et al., Direct imprinting of microcircuits on graphene oxides film by femtosecond laser reduction, Nano Today, 2010 vol. 5, Elsevier Ltd.
Zhongqing Wei, et al., Nanoscale Tunable Reduction of Graphene Oxide for Graphene Electronics, Science, 2010 vol. 328.
Daniel R. Dreyer et al.i, Carbocatalysis: Heterogeneous carbons finding utility in synthetic chemistry, Chem. Sci., 2011, vol. 2, Royal Society of Chemistry.
Wei Gao, et al., Direct laser writing of micro-supercapacitors on hydrated graphite oxide films, Nature Nanotechnology, 2011 vol. 6, Macmillan Publishers Limited.
Xiluan Wang, et al. Size Fractionation of Graphene Oxide Sheets by pH-Assisted Selective Sedimentation, J.Am.Chem.Soc., Mar. 30, 2011, vol. 133, American Chemical Society.
A. Jaeton Glover, et al., Charge-Driven Selective Adsorption of Sodium Dodecyl Sulfate on Graphene Oxide Visualized by Atomic Force Microscopy, J. Phys. Chem. C., Aug. 25, 2012 vol. 116, American Chemical Society.
Deepti Krishnan, et al., Energetic graphene oxide: Challenges and opportunities, Nano Today, 2012 vol. 7, Elsevier Ltd.
Songfeng Pei et al., The reduction of graphene oxide, Carbon, 2012 vol. 50, Elsevier Ltd.
Suenne Kim, et al., Room-temperature metastability of multilayer graphene oxide films, Nature Materials, Jun. 2012, vol. 11, Macmillan Publishers Limited.
Yan Jia-lin, et al., Functionalized graphene oxide with ethylenediamine and 1,6-hexanediamine, New Carbon Materials, Oct. 2012, vol. 27 Iss. 5, Elsevier Limited.
Ashok Kumar Das, et al. Iodide-mediated room temperature reduction of graphene oxide: a rapid chemical route for the synthesis of a bifunctional electrocatalyst, J.Mater.Chem.A, Nov. 12, 2013, vol. 2, The Royal Society of Chemistry.
Steven J. Woltornist, et al., Conductive Thin Films of Pristine Graphene by Solvent Interface Trapping, American Chemical Society, 2013 vol. 7 No. 8.
Valeria Nicolosi, et al. Liquid Exfoliation of Layered Materials, Science, 2013 vol. 340, AAAS.
Ayrat M. Dimiev et al, Mechanism of Graphene Oxide Formation, American Chemical Society, 2014 vol. 8 No. 3.
B. Rezania, et al., Hydration of Bilayered Graphene Oxide, Nano Lett., 2014 vol. 14, American Chemical Society.
Chun Kiang Chua et al., Chemical reduction of graphene oxide: a synthetic chemistry viewpoint, Chem. Soc. Rev. 2014, 43.
Priyank V. Kumar, et al., Scalable enhancement of graphene oxide properties by thermally driven phase transformation, Nature Chemistry, Feb. 2014 vol. 6, Macmillan Publishers Limited.
Stefanie A. Sydlik, et al., In Vivo Compatibility of Graphene Oxide with Differing Oxidation States, American Chemical Society, 2015 vol. 9, No. 4.
Steven J. Woltornist, et al., Polymer/Pristine Graphene Based Composites: From Emulsions to Strong, Electrically Conducting Foams, Macromolecules, 2015 vol. 48, American Chemical Society.
Harish V. Kumar, et al. Fractionation and characterization of graphene oxide by oxidation extent through emulsion stabilization, Carbon, 2016 vol. 98, Elsevier Ltd.

* cited by examiner 1-step Fractionation (fr)

FRACTIONATION OF GRAPHENE OXIDE THROUGH EMULSION STABILIZATION AND GRAPHENE OXIDE PRODUCED THEREBY

CROSS-REFERENCE TO RELATED APPLICATIONS

The present application claims priority benefit to U.S. Provisional Patent Application No. 62/417,717, entitled "Fractionation of Graphene Oxide Through Emulsion Stabilization and Graphene Oxide Produced Thereby," which was filed on Nov. 4, 2016. The content of the foregoing provisional application is hereby incorporated by reference.

GOVERNMENT RIGHTS

This invention was made with government support under Grant DMR-1111021 awarded by the National Science Foundation. The government has certain rights in the invention.

BACKGROUND

Technical Field

The present disclosure is directed to advantageous methods for processing graphene oxide sheets with a fractionation process that yields materials demonstrating desired properties and allowing isolation of graphene oxide sheets with only small amounts of oxidation. The isolated graphene oxide material exhibits beneficial properties, including effective processablity, high levels of exfoliation as compared to graphite and low level of defects as compared to conventional reduced graphite oxide.

Background Art

The oxidation of graphite to graphite oxide (GO) is a widely used approach for the exfoliation and dispersion of oxidized graphene sheets in water [1] with many research articles describing research utilizing GO. Despite the enormous amount of attention, however, there is currently no routine method for the global characterization or fractionation of the highly dispersed material produced by the oxidation of graphite.

The oxidation of graphite was first reported over 150 years ago by Brodie in an attempt to determine the atomic weight of carbon [3]. The approach has changed and been improved over the years [4]7], but the mechanism of oxidation is still an active area of research [7]. Two things are clear about GO, however: it is a very polydisperse material in terms of the level of oxidation of individual sheets [6,8], and every batch of GO has a unique distribution of oxidized sheets [6,9]. The oxidation process requires the use of harsh conditions, often involving sulfuric acid and potassium permanganate, and produces sheets with a wide range of oxidation levels, with some sheets highly oxidized and others having nearly no oxidation. That the GO is not a mixture of oxidized and unoxidized sheets is supported by the phenomenon that unoxidized graphite cannot be suspended in water, even upon extensive mixing, whereas GO can yield a suspension that is stable for at least several weeks. Additionally, a recent study of the mechanism of GO formation convincingly argues that oxidation of the graphene sheets in graphite is a diffusion controlled reaction, and the study found the use of 2 wt equivalents of oxidizing agent produced sheets that varied from lightly to fully oxidized. [7]

This is problematic, however, as different synthetic approaches, and even the same approach but with different batches, can yield GO with very different extents of oxidation, and thus different properties, making the characterization of the batches a critical need for GO based research. The availability of more uniform and better characterized GO would be of great utility for controlling the chemical, physical, electrical, and thermal properties of GO and accelerating the pace of GO utilization in medical devices [10], nanoelectronics [11], electromechanical systems [12], sensors [13], composites [14], catalysis [15], energy storage devices [16], and optics [17].

Currently, the characterization of GO batches is generally undertaken by methods that look at individual sheets, such as AFM or electron microscopy, that require time consuming and tedious work to obtain any global data, or by methods that give an overall average of the batch. Although knowing the overall average degree of oxidation is useful, it does not give any information as to how the oxidation is distributed, e.g., whether the GO batch is composed of a few highly oxidized sheets and/or whether all of the sheets characterized by roughly the same level of oxidation. Knowledge of this critical information has a significant impact on understanding the properties of devices and materials made with that batch of GO.

In addition, reduced graphene oxide (rGO) has heretofore been synthesized in a two-step process: (i) oxidation of graphite to graphite oxide followed by reduction of the graphite oxide to reduced graphite oxide (rGO). Unfortunately, rGO contains a high defect density, significantly reducing its properties, and can be expensive to produce, as the reduction process is either a stoichiometric chemical process or a thermal process with temperatures often too high to use with composites.

The present disclosure addresses the shortcomings of the prior art and provides advantageous methods for processing graphene oxide sheets using a fractionation process that yields a graphene oxide material that exhibits desired properties. Additional features, functions and benefits of the present disclosure will be apparent from the detailed description which follows.

SUMMARY

The present disclosure provides an advantageous method for fractionating and isolating components of oxidized graphene material through an oil and water (e.g., chloroform and water) emulsification fractionation process. The disclosed method advantageously overcomes problems encountered in conventional processing of graphene. As is readily apparent, the incredible mechanical strength, thermal conductivity, and electrical conductivity of exfoliated graphene can only be utilized if it can be effectively processed. However, the lack of chemical functionality on graphene sheets makes it very difficult to process and, as noted previously, the conventional two-step process for synthesizing reduced graphene oxide (rGO) yields material that contains a high defect density, significantly reducing its properties, and the two-step process can be expensive because, inter alia, the reduction process is either a stoichiometric chemical process or a thermal process with temperatures often too high to use with composites.

The present disclosure further advantageously yields a new type of graphene (in addition to conventional graphene materials, such as graphene oxide (GO), reduced graphene oxide (rGO) and the like) which is isolated from graphite oxide according to the disclosed fractionation process.

In a nutshell, the present disclosure provides a method for separating out graphene oxide (GO) sheets with desired properties, rather than reducing an entire batch of GO, thereby allowing production of GO sheets with only small amounts of oxidation. The graphene-based material generated according to the present disclosure beneficially allows downstream processing capabilities akin to those available with conventional rGO, but the material produced according to the present disclosure is not rGO due to the absence of reduction in the production modality. At the same time, the material generated according to the present disclosure has a high level of exfoliation as compared to graphite and a low level of defects, making its overall properties better than conventional rGO.

The methods and materials of the present disclosure offer many significant advantages relative to prior art teachings, including:

- Improved material properties—synthesis of rGO reduces sheets that have been damaged by oxidation, only partly fixing the damage. The sheets produced by the disclosed methods were never fully oxidized, and so never had the damage encountered with conventional rGO synthesis.
- Safety—no thermal or chemical reaction to form rGO from GO. Rather, the present disclosure involves a fractionation process which is much safer than conventional rGO synthesis.
- Saves money—the disclosed fractionation method utilizes an oil solvent (e.g., chloroform, toluene, benzene, and the like) and water. When these processing constituents are compared to the large quantities of reducing agents, such as hydrazine, needed to form conventional rGO, significant cost savings are readily apparent.
- Saves time—the disclosed method yields graphene-based material faster than methods for synthesis of conventional rGO because, inter alia, there is no purification step involved in the disclosed method, but conventional rGO processing involves expensive, difficult and time consuming purification steps.

The disclosed process and product have wide ranging applications and utilities. For example, the disclosed fractionation process may be used to produce material for use in any application where rGO (reduced graphene oxide) is conventionally used. These applications include, without limitation, device manufacture or nanocomposite applications. In addition, the disclosed fractionation method may be used to produce graphene-based materials for use in electrically or thermally conductive composites for heat transfer applications in electronics, for electronic shielding, for increased composite strength, for conductive layers in solar cells, and for flame retardant materials. Indeed, the methods of the present disclosure find beneficial utility in in controlling the chemical, physical, electrical, and thermal properties of GO and accelerating the pace of GO utilization in medical devices, nanoelectronics, electromechanical systems, sensors, composites, catalysis, energy storage devices, and optics.

Additional features, functions and benefits of the disclosed methods and the materials generated according to the disclosed methods will be apparent from the detailed description which follows.

BRIEF DESCRIPTION OF THE FIGURES

The description will be more fully understood with reference to the following figures, wherein.

DESCRIPTION OF EXEMPLARY EMBODIMENT(S)/EXPERIMENTAL RESULTS

The advantageous method of the present disclosure is described with reference to exemplary implementation(s) thereof. However, it is to be understood that the present disclosure is not limited by or to the to the exemplary implementation(s) described herein, but is susceptible to variations, modifications and/or enhancements without departing from the spirit or scope of the present disclosure.

Figure 1:
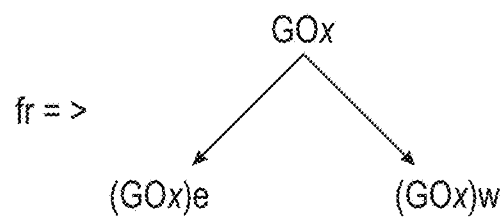
FIG. 1 provides a schematic depiction of one-step fractionation ('fr')
Figure 2:
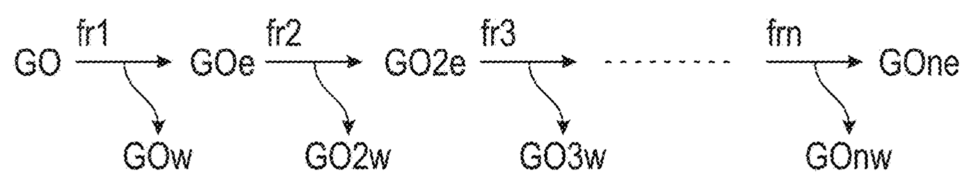
FIG. 2 provides a schematic illustrating multiple fractionations.

According to an exemplary embodiment of the present disclosure, fractionation of initial GO (i.e., "original GO" or simply "GO") is carried out using chloroform and water as solvents. Forming an emulsion in the presence of GO creates two phases: a water phase containing highly oxidized GO and a lower oil-in-water emulsion phase containing the advantageous graphene-based material of the present disclosure (i.e., "uGO"). The solvents used to form the emulsion may be advantageously recycled. The final emulsion fraction after 'n' number of fractionation steps is referred to as $GO_{ne}$. FIG. 1 illustrates "fr", which is 1-step fractionation of $GO_x$ into two of its fractions, the emulsion fraction $GO_{xe}$ and the water fraction-$GO_{xw}$. With regards to FIG. 2, $GO_{ne}$ is the fractionation products of n fractionations of GO.

For a particular GO/water/oil system, a particular value of n giving $GO_{ne}$ is called uGO. Generally, it is when XRD r ratio (area of GO peak divided by area of graphite peak) is <0.50. The XRD r ratio is one way to determine the degree of oxidation of a GO sample. Higher 'r ratio' means a greater degree of oxidation. An example is shown in FIG. 3 below.

Each fractionation step uses an oil/water based emulsion to obtain an emulsion fraction ($GO_e$) and water fraction ($GO_w$), as schematically depicted in FIG. 1. After performing six (6) fractionation steps, i.e., n=6 with reference to FIG. 2, to obtain $GO_{6c}$, the r ratio is 0.45 (see FIG. 4), and we assign it uGO from a 6-step fractionation using chloroform-water emulsion system.

1. X-Ray Diffraction Characterization Approach

Figure 3:
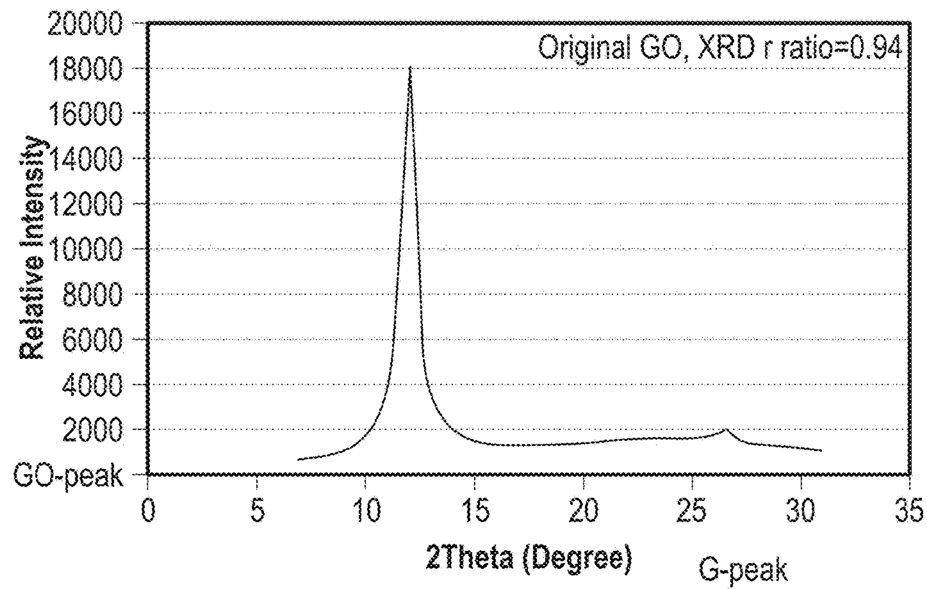
FIG. 3 provides a graph related to original GO XRD spectrum.
Figure 4:
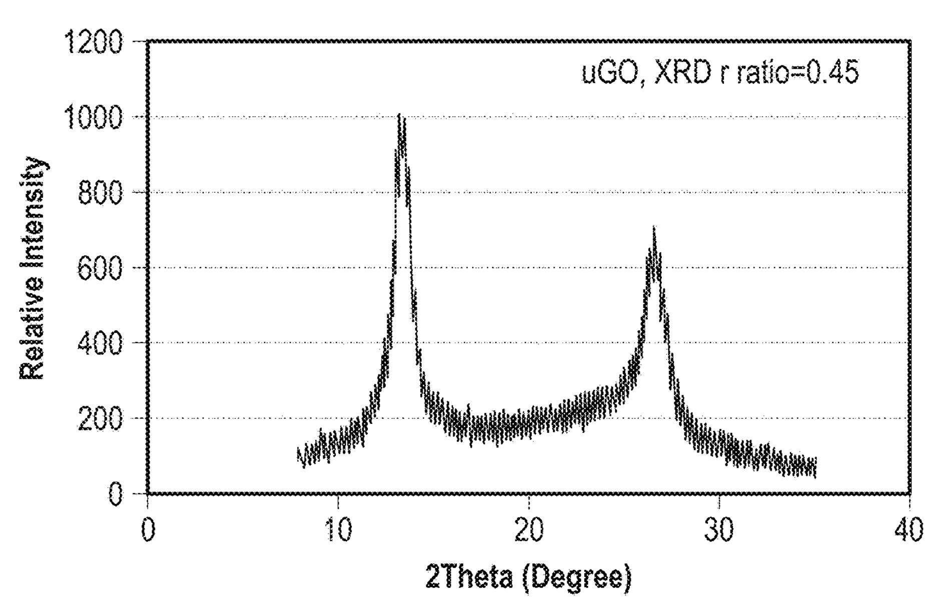
FIG. 4 provides a graph related to uGO XRD spectrum.

With reference to FIG. 3, XRD r value for GO~0.94. This is the GO used for 6 fractionation steps to obtain final fraction-uGO. With reference to FIG. 4, XRD r value for uGO~0.45.

2. Raman Spectroscopy Characterization Approach

Figure 5:
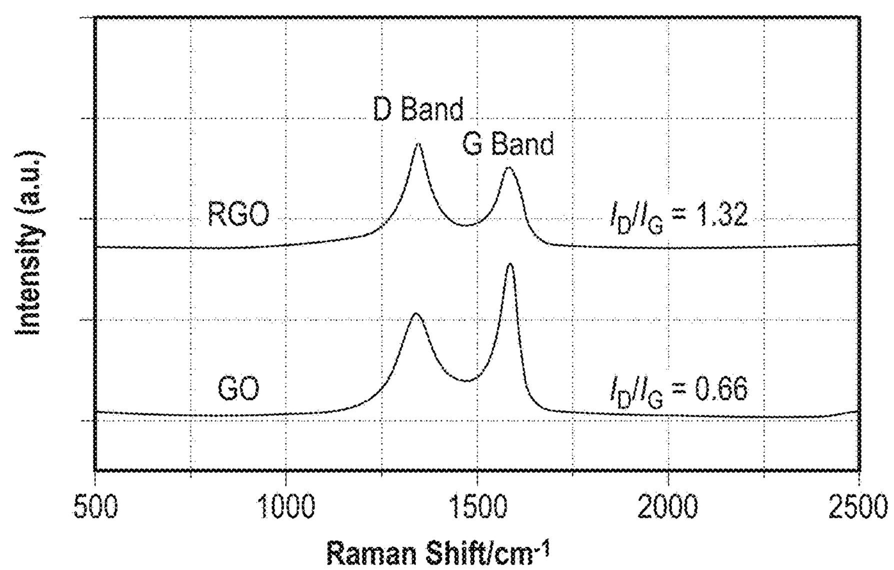
FIG. 5 provides a graphic comparison of D/G peak intensity ratio of rGO and GO peaks.

Conversion of GO to rGO leads to higher D peak intensity (relative to G peak intensity). This is a well known indication of increased disorder in the system. A typical example is shown in FIG. 5 (Taken from: *J. Mater. Chem. A,* 2014, 2, 1332-1340.). Here, the D/G ratio is much higher for rGO as compared to the GO used to make that rGO.

Figure 6:
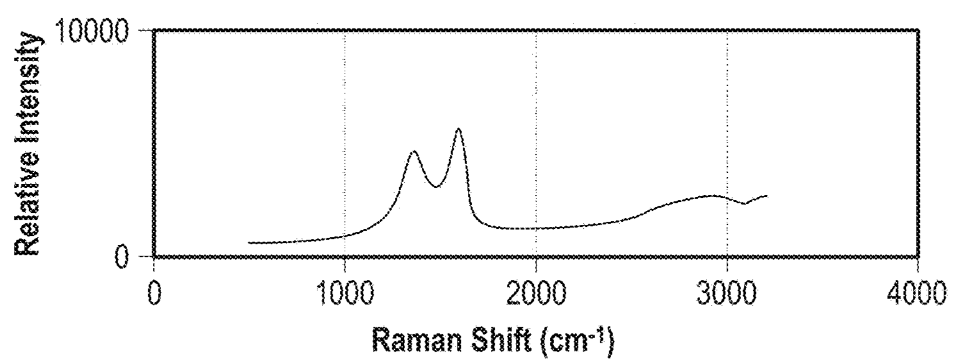
FIG. 6 provides a graph related to original GO D/G peak intensity ratio.
Figure 7:
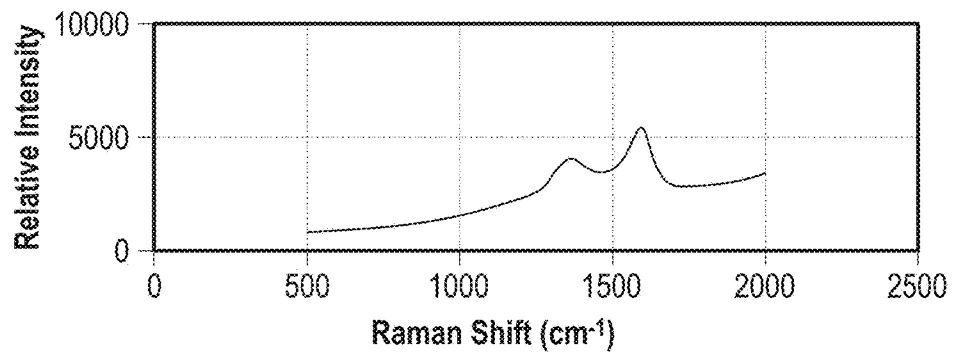
FIG. 7 provides a graph related to uGO D/G peak intensity ratio.

On the other hand, the D/G ratio in Raman spectrum of the disclosed uGO decreases as compared to that of GO from which it was isolated as shown in FIG. 6. The GO (Original GO) D/G peak intensity ratio is equal to 0.75. As shown in FIG. 7, the disclosed uGO D/G peak intensity ratio is equal to 0.69.

The Raman results set forth above may be used for the following purposes and support the following conclusions:

- identification of uGO
- indication that uGO has fewer defects than rGO
- confirming the presence of a lesser degree of oxidation (i.e., more delocalization of electrons/C═C bonds), one reason for the better properties of uGO as compared to rGO.

Additional experimental work according to the present disclosure is set forth below.

3. Experimental

The nomenclature used is as follows: the region the fraction is taken from ("w" for water and "e" for emulsion) is used as a subscript to denote the route from the original GO to the current fraction. For instance, if GO is fractionated by separating the water and emulsion phases, the material obtained from the water phase is denoted $GO_w$ and the material isolated from the emulsion phase is denoted $GO_e$. If the $GO_e$ material is then fractioned, the sample from the water phase is $GO_{ew}$, and the sample from the emulsion phase is $GO_{ee}$.

For a typical fractionation procedure, 20 mg of graphite oxide (GO) was added to 5 ml of DI water in a 20 ml scintillation vial. The mixture was then bath sonicated for 1 minute. After sonication, the GO was dispersed and the suspension appeared black. Next, 5 ml of chloroform was added to the suspension. This GO in a chloroform/water system was then mixed for 1 minute using a Kinematica Brinkmann Polytron Homogenizer mixer (Model PT 10-35), leading to the formation of a stable emulsion. As the oil phase is chloroform, with a density greater than water, the spheres were seen at the bottom of the vial ($GO_e$ fraction). The top region (containing $GO_w$) consisted of a uniformly black water/GO suspension. Other organic solvents, such as heptane and benzene, form water and emulsion phases as well, but the emulsion phase is the top layer in those cases.

Both types of GO fractions ($GO_e$ & $GO_w$) were obtained from the fractionation vial using a glass pipette. $GO_e$ emulsions were very stable (hours/minutes) so the emulsion phase could be obtained, even with multiple pipetting, without disturbing the phase separation. In all cases, the fractions were dried in air at 70° C. For XRD analysis, each GO sample was drop cast onto a glass slide (20 mm×5 mm) and dried at 70° C. and for FTIR, 1 mg of the GO sample was mixed with 99 mg of KBr and pressed into a pellet.

Hummers GO.

For GO synthesized using the Hummer's method, 625 mL of concentrated sulfuric acid and 12.5 g sodium nitrate was stirred for 30 minutes and 25 g graphite (Ashbury Mills grade 3243, avg sheet size 50 μm) was added over 20 minutes, followed by the slow addition of 75 g potassium permanganate. After 2 hours, the reaction was quenched by adding 1.5 L water and 625 mL 30% hydrogen peroxide. For workup, 625 mL concentrated hydrochloric acid was added. The GO used for fractionation was obtained after purification using filtration and centrifugation. This GO was used in all experiments except for the data shown in FIG. 10, where the GO was reacted for 5 hours rather than 2 hours.

Improved GO [6].

A 9:1 mixture of $H_2SO_4/H_3PO_4$ (360:40 mL) was added to a mixture of 3.0 g graphite flakes (Ashbury Mills grade 3243, avg sheet size 50 μm) and 18.0 g $KMnO_4$. After 15 min of stirring, the reaction was heated to 50° C. and stirred for an additional 12 h. The reaction was allowed to cool to room temperature and poured onto 400 mL ice and 3.0 mL 30% $H_2O_2$. The filtrate was centrifuged (5000 rpm for 3 hrs), and the supernatant was decanted off. The remaining solid material was then washed in succession with 200 mL of water, 200 mL of concentrated HCl, and two additional centrifugations, removing the supernatant each time. The final pH was observed to be 6.5. The solid obtained on the filter was vacuum-dried overnight at room temperature.

CabGO.

Commercial sample whose preparation is proprietary.

Go-Hydrogel.

A polymer hydrogel was formed by mixing the following hydrogel constituents: 6 mL of DI water; 4 mL of Heptane; 0.5 g of HMA (hydroxymethylacrylamide); 6 mg of N,N'-Methylenebisacrylamide crosslinker; 10 mg of potassium peroxodisulfates (KPS); 5.5 mg of N,N,N,N-tetramethylethylenediamine (TEMED); and 15 mg of GO. Due to the presence of water and oil, the system gives rise to an emulsion stabilized by GO sheets. The mixture is then stored overnight at 40° C. The result of the process is a GO-hydrogel.

uGO-Hydrogel.

A polymer hydrogel was formed by mixing the following hydrogel constituents: 6 mL of DI water; 4 mL of Heptane; 0.5 g of HMA (hydroxymethylacrylamide); 6 mg of N,N'-Methylenebisacrylamide crosslinker; 10 mg of potassium peroxodisulfates (KPS); 5.5 mg of N,N,N,N-tetramethylethylenediamine (TEMED); and 15 mg of uGO. Due to the presence of water and oil, the system gives rise to an emulsion stabilized by uGO sheets. The mixture is then stored overnight at 40° C. The resultant is a uGO-hydrogel.

Electrical Conductivity.

Electrical conductivity of dried GO films of size 2 cm×1 cm×190 μm was calculated using a "FLUKE 25 Multimeter". The two test leads of the Multimeter were put on the two ends of the GO film and conductance was measured. To ensure maximum contact of GO film surface and the test lead ends, carbon tape was used at both ends of GO film. Electrical conductivity was calculated using the conductance value and GO film dimensions.

4. Results and Discussion

Figure 8A:
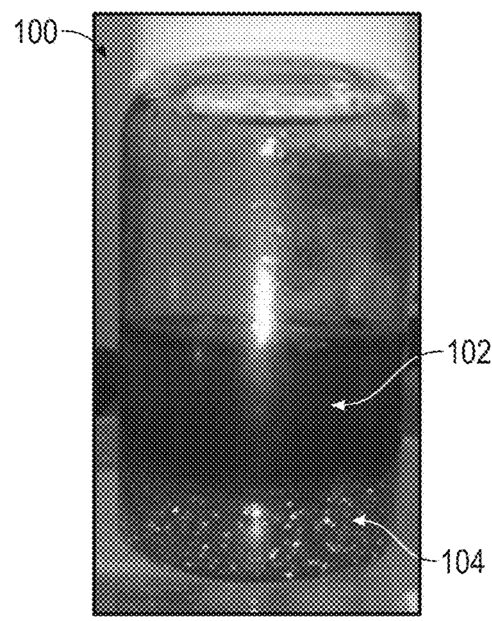
FIG. 8A provides an image of fractionated GO.

The literature teaches that pristine (never oxidized) graphene sheets behave as two dimensional surfactants in stabilizing the high energy interface between immiscible oil and water phases to form water-in-oil emulsions [18,19]. Likewise, when GO is agitated in a water/oil mixture, the literature [20] teaches that that oil-in-water emulsions can be stabilized. However, we also find that the more intact, less oxidized sheets in the GO batch are better at stabilizing the interface and give rise to a stable emulsion phase, while the more oxidized sheets partition to the water phase. Separating these two phases fractionates the GO into a more and a less oxidized sheet population. Such an emulsion 100, with an upper water phase ($GO_w$) 102 and lower emulsion phase ($GO_e$) 104 is shown in FIG. 8A. Specifically, the upper phase 102 contains GO suspended in water ($GO_w$) and the lower region 104 contains GO at the interface of a chloroform-in-water emulsion ($GO_e$). Although oil phases such as heptane and toluene also give rise to emulsions, having the emulsion as the lower phase is advantageous for separation, and thus chloroform/water is the system used in all of our reported investigations.

Figure 8B:
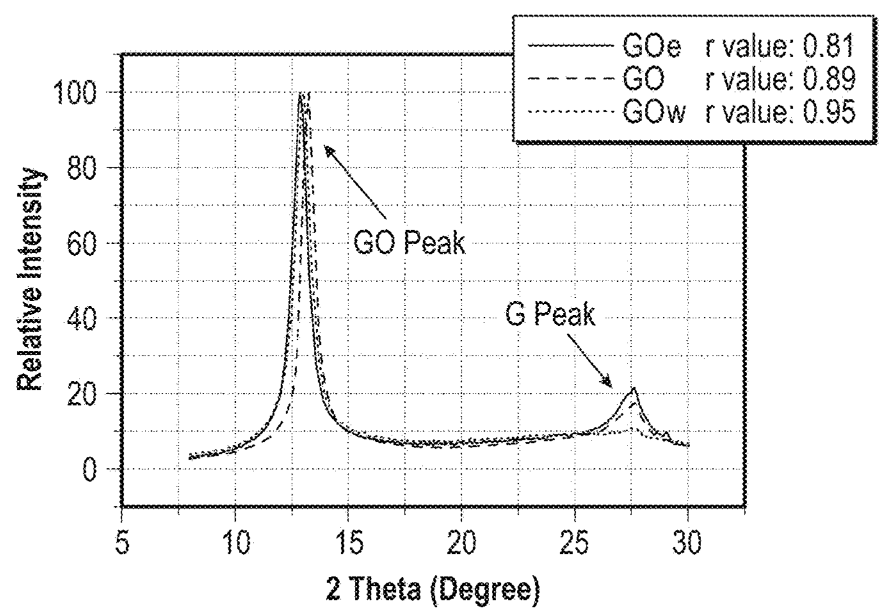
FIG. 8B provides a graph illustrating overlaid XRD spectra of the original GO sample, the GOw from the water phase, and $GO_e$ from the emulsion phase.

After forming two phases, the water phase, i.e., the $GO_w$ phase, is separated from the emulsion phase, i.e., the $GO_e$ phase, and both are analyzed. FIG. 8B compares the XRD spectra of the original GO and the GOw and GOe fractions. XRD analysis indicates the spacing of the stacked sheets, with the smaller peak at $2\theta=26.6$ arising from the 0.33 nm graphite stacking and the larger peak at $2\theta=10\text{-}13.5$ arising from the increased spacing due to the oxidation of the graphene sheets [21]24]. To quantify the observed differences, the area of the peak assigned to graphite stacking, $A_G$, is used and the area of the peak assigned to GO stacking, $A_{GO}$, is used to calculate the value of r.

$$r=A_{GO}/(A_{GO}+A_G)$$

According to the present disclosure, it has been found that the value of r decreases in the order of $GO_w$>GO>$GO_e$, indicating an increasing fraction of graphitic spacing in the samples going from water soluble fraction to original material to emulsion fraction. Table 1 shows the values, as well as the value for $GO_{eee}$, a sample in which the emulsion fraction is fractionated two additional times. The closeness of the value of r for $GO_{eee}$ to 1 indicates that the fraction contains very little material that shows GO spacing.

XRD, however, does not directly measure the extent of oxidation. For that, elemental analysis of the fractions is obtained, and the results are shown in the second column of Table 1. The ratio of carbon to oxygen is observed to directly correlate with the trend seen by XRD, with the C/O ratio increasing from $GO_w$ to GO to $GO_e$ to $GO_{eee}$. This same trend is also observed in measurements of the electrical conductance of films made with each fraction with the most oxidized material, the $GO_w$, showing the least conductance. This is to be expected, as oxidation is known to disrupt the conjugation in graphene responsible for electrical conductivity. [25]

Figure 8C:
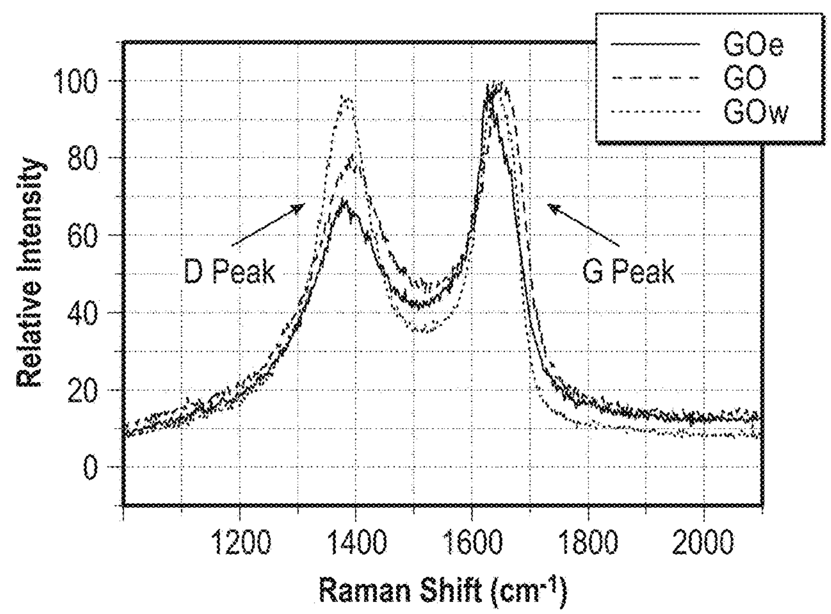
FIG. 8C provides a graph illustrating overlaid Raman spectra of GO, $GO_w$, and $GO_e$ showing the G and D peaks.

This disruption can be seen as well by Raman spectroscopy, where the ratio of the D and G peaks is often used as an indication of the degree of conjugation in graphene [26]. The Raman spectra of GO contains G and D peaks where the G peak at ~1580 $cm^{-1}$ is the result of bond stretching of $sp^2$ hybridized carbons and the D peak at ~1340 $cm^{-1}$ is the result of defects in the graphene sheets [18,27]. These defects correspond to disorder in the sample that can be a result of oxygenated functionalities in the graphene plane. Shown in FIG. 8C, the ratio of the D and G peaks indicate a trend from less ordered to more ordered moving from $GO_w$ to GO to $GO_e$. This is the same trend observed for the XRD, elemental analysis and conductivity studies.

Figure 8D:
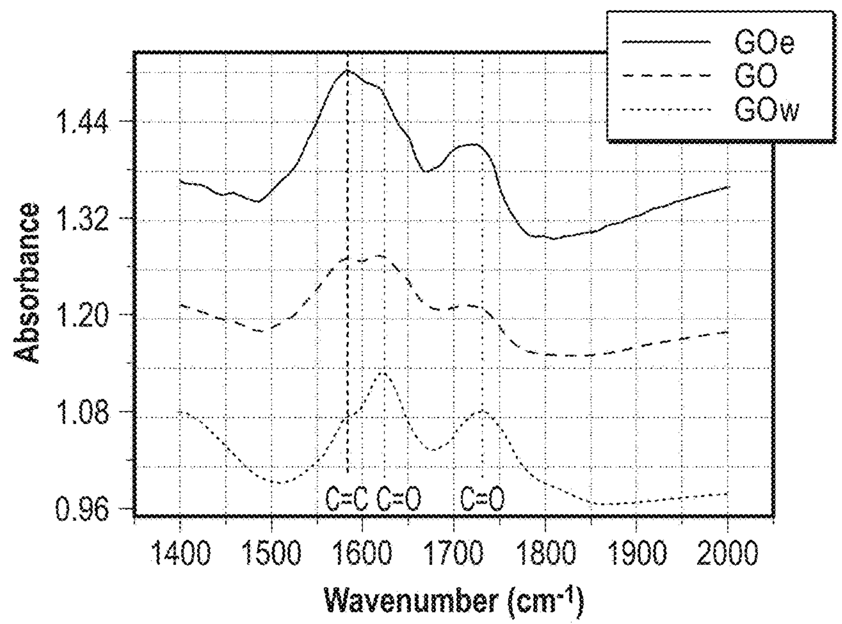
FIG. 8D provides a graph illustrating overlaid FTIR spectra of GO, $GO_w$, and $GO_e$ highlighting changes in relative intensities of peaks at 1580 $cm^{-1}$ ($sp^2$-hybridized C═C), 1620 $cm^{-1}$ (ketone C═O), and 1730 $cm^{-1}$ (carboxyl C═O)

These results indicate that the $GO_w$ fraction contains the more highly oxidized material, and the $GO_e$ fraction contains more lightly oxidized material. The $GO_e$ fraction has some degree of oxidation, however, as indicated by the aforementioned analysis as well as from the observation that the emulsions are oil-in-water, while pristine graphene forms water-in-oil emulsions [18,19]. The hydrophilicity imparted by the low level of oxygen functional groups is enough to flip the emulsion with respect to pristine graphene. Additionally, as shown by FTIR, FIG. 8D, chemical differences in different fractions exist as well. In the order of $GO_w$ to GO to $GO_e$, the peak at 1620 $cm^{-1}$ (ketone C═O) loses intensity relative to the peak at 1580 $cm^{-1}$ ($sp^2$-hybridized C═C)[6,28].

TABLE 1

Experimental results for different GO fractions.

| Sample | XRD r value $[A_{GO}/(A_{GO}+A_G)]$ | Carbon to Oxygen weight ratio | Electrical Conductance ($\times 10^{-6}$ S) |
|---|---|---|---|
| GOeee | 0.49 | 2.28 | 2.49 |
| GOe | 0.81 | 1.86 | 1.42 |
| Original GO | 0.89 | 1.71 | 0.73 |
| GOw | 0.95 | 1.43 | 0.52 |

Figure 9A:
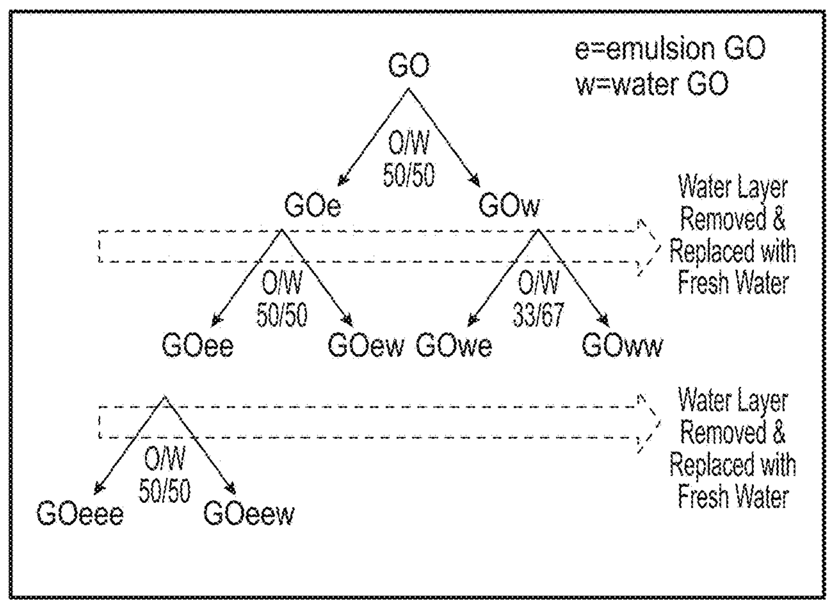
FIG. 9A provides a schematic illustration of stepwise GO fractionation and nomenclature.
Figure 9B:
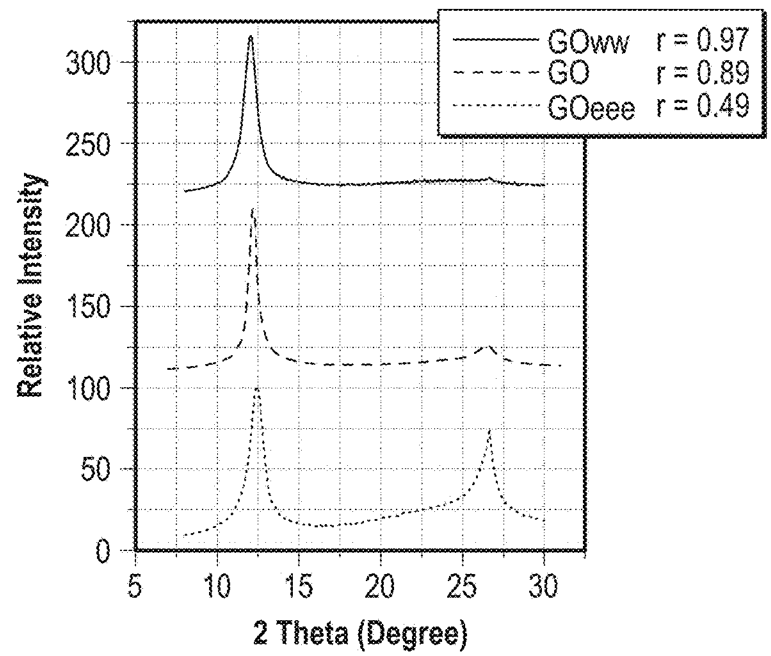
FIG. 9B provides a graph illustrating XRD spectra of original GO, GOww and GOeee fractions showing the substantial increase of material dis-playing pristine graphite spacing with multiple emulsion fractions.

Like the fractionation of polymers done in the early days of polymer science, it is possible to fractionate the fractions of GO. FIG. 9A shows a general outline of the multiple fractionations. Comparing the XRD of triply and doubly fractionated materials with GO in FIG. 9B shows a much greater difference in the GO/graphite peak ratio than is seen after a single fractionation. Note, all samples originated from the same batch of GO. In decreasing order of graphitic content by XRD we find Geee,>GOe>GO>GOw>GOww. This trend shows the emulsion fraction always prefers the less oxidized, or more graphitic, population of the available GO in the system. Again, like for the fractionation of polymers, this fractionation can be repeated as many times as desired to create fractions with ever narrower distributions of oxidation levels. In addition to allowing the formation of less disperse samples of GO, fractionation can also be used to characterize batches of GO produced by different synthetic approaches. As an example, three different GO batches have been compared: one synthesized via a standard Hummers method [5], one by the recently introduced improved GO method (IGO) [6] and one sample (CabGO) was obtained from industry/Cabot (the preparation method is proprietary).

Figure 10A:
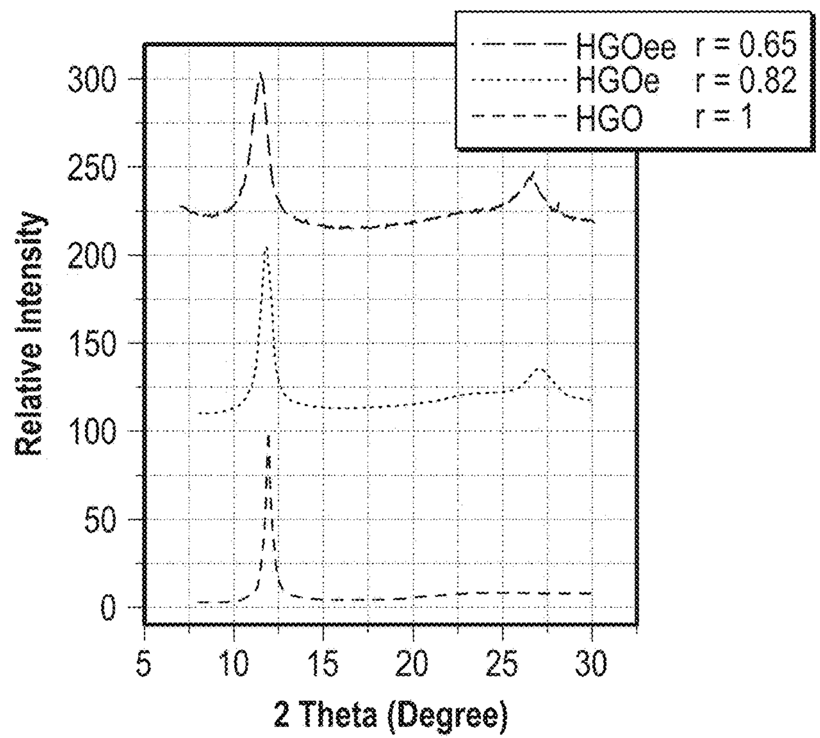
FIG. 10A provides a graph illustrating XRD patterns of Hummers GO and its emulsion fractions.
Figure 10B:
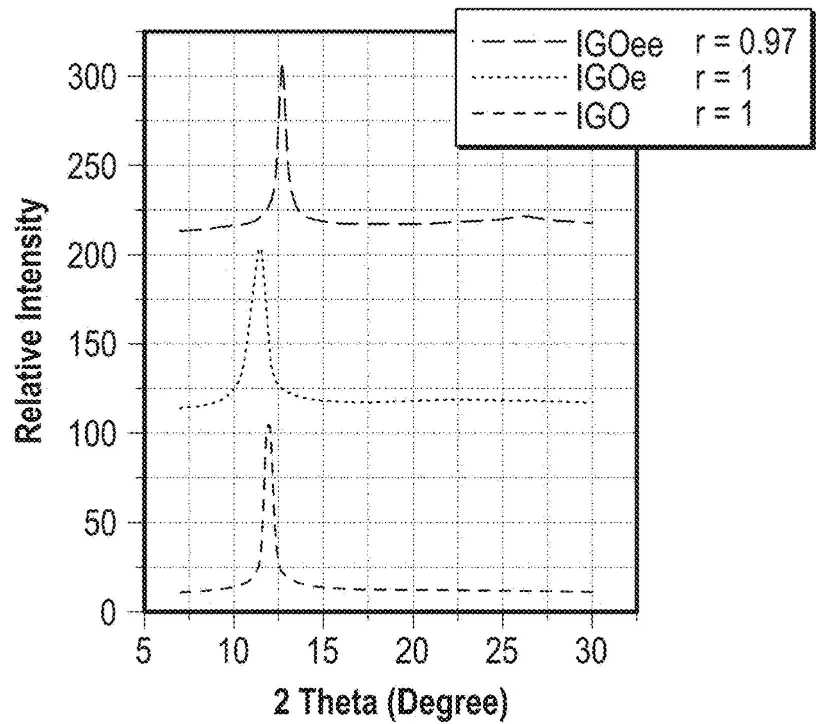
FIG. 10B provides a graph illustrating XRD patterns of Improved GO (IGO) and its emulsion fractions.
Figure 10C:
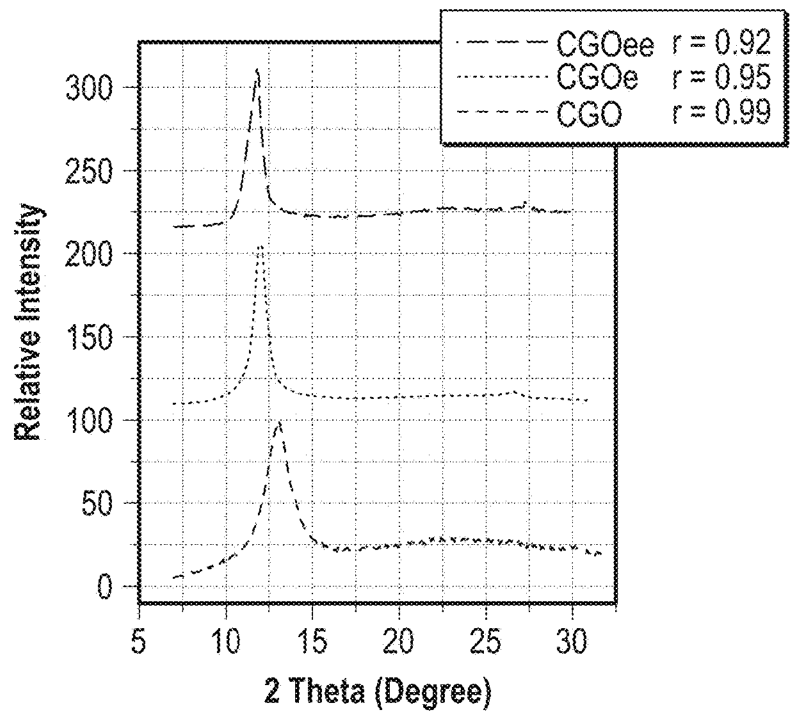
FIG. 10C provides a graph illustrating XRD patterns of CabGO (CGO) and its emulsion fractions.

Shown in FIG. 10 are the XRD spectra of each GO type, with the lower black curve being from the unfractionated sample. They initially appear similar, with a prominent peak arising from oxidized material, and no visible graphitic peak. However, after a single fractionation, there is a clear difference. The $GO_e$ and $GO_{ee}$ fractions of the Hummers GO, FIG. 10A, show a clear increase in the area of the graphitic peak, indicating a significant population of material with pristine graphite stacking. FIG. 10B shows that the IGO material contains no significant graphitic peak in the $GO_e$ fraction and only a very small graphitic peak in $GO_{ee}$ fraction, indicating that the less oxidized material contains only trace amounts of the original stacking. Lastly, in FIG. 10C, the CabGO is shown to have a small but measurable amount of residual graphite stacking. It should be noted that interlayer spacing for GO fractions may not be identical, even for those fractions coming from the same batch. We believe this to be a result of hydration, which is well known to affect the spacing in GO materials. [29]

The fractionation approach of the present disclosure clearly separates more highly oxidized GO from less oxidized GO. In addition to the effectiveness of the separation process, however, is a question as to the state of oxidation of the individual sheets. For example, is the GO a mixture of oxidized and pristine graphene sheets, does each sheet contain a uniform degree of oxidation, or do individual sheets contain a distribution of degrees of oxidation?

The first step in the disclosed fractionation approach is suspension of the entire GO sample in water, it is not believed that there is any significant amount of entirely un-oxidized graphene sheets in the GO samples. Evidence comes from analysis of $GO_w$, $GO_{ww}$, and $GO_{www}$ fractions. As there can be no graphite in the water soluble $GO_w$, further fractionation into $GO_{ww}$ and $GO_{www}$ should only lead to changes in oxidation level if individual sheets contained a different degrees of oxidation. That is what is observed in the experimental studies disclosed herein, and the XRD of each fraction is shown in the foregoing figure. Although the difference is less than observed with $GO_e$, $GO_{ee}$, and $GO_{eee}$, there is a clear change in oxidation with further fractionation.

Whether each individual sheet is oxidized uniformly is another question. It is believed that single sheets can contain regions with differing degrees of oxidation. This view derives from previous work [7], in which the proposed mechanism of diffusion controlled oxidation means that non-uniform flake size would lead to complete diffusion of oxidizing agent for smaller flakes and incomplete diffusion for larger ones, producing sheets with oxidized edges and un-oxidized centers. In addition, AFM studies of GO using an anionic surfactant to create contrast between oxidized and unoxidized regions on GO have directly imaged more than one level of oxidation on a single GO sheet. [30]

Figure 11:
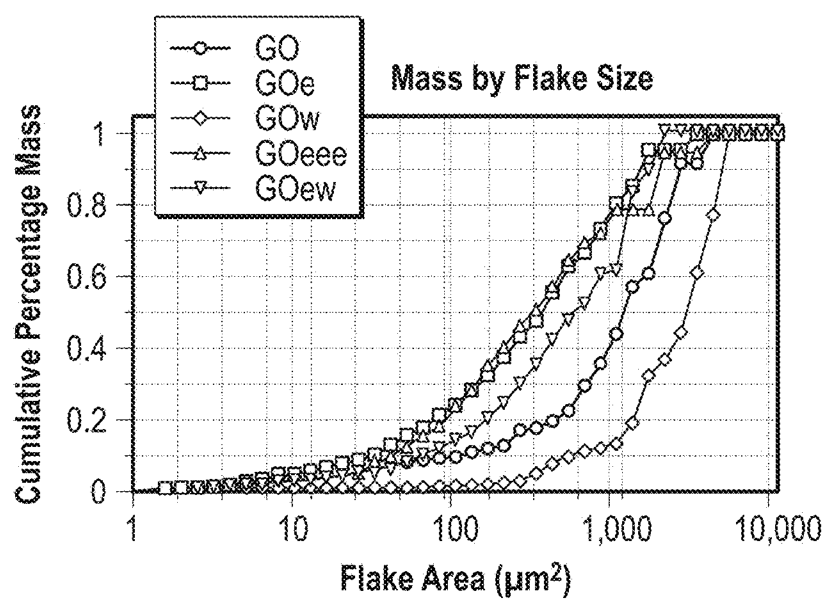
FIG. 11 provides a graph illustrating cumulative percentage mass as a function of GO sheet flake area of various GO fractions.

FIG. 11 depicts the cumulative percentage of mass as a function of the GO sheet flake area, based on various GO fractions, obtained from optical analysis. The cumulative percentage of mass increases at a faster rate, as a function of the flake area, in the order of $GO_w$ to GO to $GO_{ew}$ to $GO_{eee}$ to $GO_e$. Such results indicate that those GO fractions, e.g., $GO_e$ and $GO_{eee}$, achieve a higher cumulative percentage of mass within a smaller flake area, as compared to the other GO fractions when measured at the same cumulative percentage of mass.

Figure 12A:
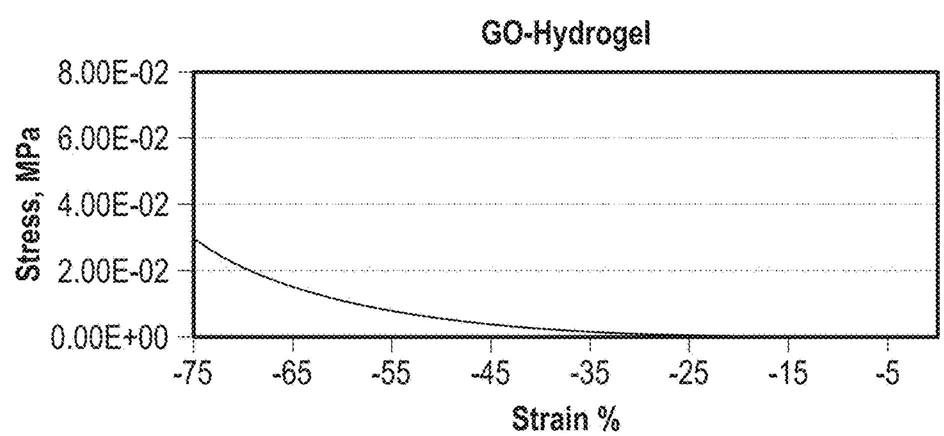
FIG. 12A provides a graph illustrating the stress of GO-hydrogel over 0 to −75% strain.
Figure 12B:
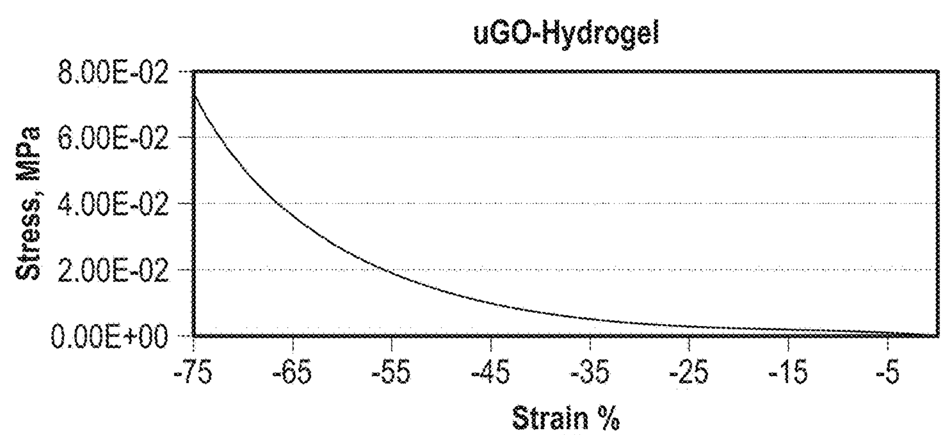
FIG. 12B provides a graph illustrating the stress of uGO-hydrogel over 0 to −75% strain.

Shown in FIGS. 12A and 12B are the stress sensitivities for the GO-hydrogel and uGO-hydrogel, respectively. In both figures, the negative strain percent value indicates compression. In comparing the two figures and referencing Table 2, below, uGO-hydrogel is more sensitive towards compression as compared to the original GO-hydrogel for a given strain range of 0 to −75%, specifically at increments −25%, −50%, and −75%.

TABLE 2

Stress values for GO and uGO hydrogels at −25, −50, and −75 Strain %.

| | Corresponding Stress (kPa) | |
|---|---|---|
| Strain % | GO hydrogel | uGO hydrogel |
| −25 | 0.84 | 3.2 |
| −50 | 5.9 | 13.8 |
| −75 | 29.7 | 72.4 |

Furthermore, the exfoliation extent is more for additionally emulsified fractions (uGO) in comparison to the original GO. Referencing Table 3, below, the percentage of single layers for sheets present in various GO fractions was calculated by optical analytics. Of note, the more emulsified fractions, e.g., $GO_{eee}$ and $GO_e$, include a higher percentage of single layer sheets, 82% and 76%, respectively, in comparison to the original GO, 60%.

TABLE 3

% Single layers for sheets present in various GO fractions

| Sample | % Single layer sheets |
|---|---|
| GO | 60 |
| $GO_w$ | 53 |
| $GO_e$ | 76 |
| $GO_{eee}$ | 82 |

5. Conclusion

The fractionation of GO results from the less oxidized material's ability to stabilize oil-in-water emulsions preferentially to more oxidized material and allows for the preparation of narrowly defined samples. The experimental results reported herein demonstrate the utility of the fractionation method, as originally all three samples appear the same but are shown to be significantly different after analyzing the emulsion fractions.

Repeated fractionations are shown to increase the enrichment of GO fractions in either higher or lower levels of oxidized material, and this enrichment can be shown by XRD, Raman spectroscopy, FTIR, and elemental analysis, all analytical techniques commonly used for GO. In addition, the present disclosure demonstrates that important physical properties, such as electrical conductivity, are directly correlated with the degree of oxidation in each fraction [31].

REFERENCES

[1] V. Nicolosi, M. Chhowalla, M. G. Kanatzidis, M. S. Strano, J. N. Coleman, Liquid Exfoliation of Layered Materials, Science (80-.). 340 (2013) 1226419. doi: 10.1126/science.1226419.

[2] J. H. Francis, P. S.; Cooke R. C.; Elliott, Fractionation of Polyethylene, J. Polym. Sci. A Polym. Chem. 31 (1958) 453-466.

[3] B. C. Brodie, On the Atomic Weight of Graphite, Philos. Trans. R. Soc. London. 149 (1859) 249-259.

[4] L. Staudenmaier, Verfahren sur Darstellung der Graphitsaure., Berichte Der Dtsch. Chem. Gesellschaft. 31 (1898) 1487.

[5] J. William S. Hummers, R. E. Offeman, Preparation of Graphitic Oxide, J. Am. Chem. Soc. 80 (1958) 1339. doi:10.1021/ja01539a017.

[6] D. C. Marcano, D. V Kosynkin, J. M. Berlin, A. Sinitskii, Z. Sun, A. Slesarev, et al., Improved Synthesis of Graphene Oxide, ACS Nano. 4 (2010) 4806-4814. doi: 10.1021/nn1006368.

[7] A. M. Dimiev, J. M. Tour, Mechanism of Graphene Oxide Formation., ACS Nano. (2014). doi:10.1021/nn500606a.

[8] A. Lerf, H. He, M. Forster, J. Klinowski, Structure of Graphite Oxide Revisited, J. Phys. Chem. B. 102 (1998) 4477-4482. doi:10.1021/jp9731821.

[9] T. Szabó, O. Berkesi, P. Forgó, K. Josepovits, Y. Sanakis, D. Petridis, et al., Evolution of surface functional groups in a series of progressively oxidized graphite oxides, Chem. Mater. 18 (2006) 2740-2749. doi:10.1021/cm060258+.

[10] S. A. Sydlik, S. Jhunjhunwala, M. J. Webber, In Vivo Compatibility of Graphene Oxide with Differing Oxidation States, ACS Nano. 9 (2015) 3866-3874.

[11] Z. Wei, D. Wang, S. Kim, S. Kim, Y. Hu, M. K. Yakes, et al., Nanoscale Tunable Reduction of, Science (80-.). 328 (2010) 1373-1377.

[12] J. T. Robinson, M. Zalalutdinov, J. W. Baldwin, E. S. Snow, Z. Wei, P. Sheehan, et al., Wafer-scale reduced graphene oxide films for nanomechanical devices, Nano Lett. 8 (2008) 3441-3445. doi:10.1021/nl8023092.

[13] J. T. Robinson, F. K. Perkins, E. S. Snow, Z. Wei, P. E. Sheehan, Reduced Graphene Oxide Molecular Sensors, Nano Lett. 8 (2008) 3137-3140. doi:10.1021/nl8013007.

[14] K. W. Putz, O. C. Compton, M. J. Palmeri, S. T. Nguyen, L. C. Brinson, High-nanofiller-content graphene oxide-polymer nanocomposites via vacuum-assisted self-assembly, Adv. Funct. Mater. 20 (2010) 3322-3329. doi: 10.1002/adfm.201000723.

[15] D. R. Dreyer, C. W. Bielawski, Carbocatalysis: Heterogeneous carbons finding utility in synthetic chemistry, Chem. Sci. 2 (2011) 1233. doi:10.1039/c1sc00035g.

[16] W. Gao, N. Singh, L. Song, Z. Liu, A. L. M. Reddy, L. Ci, et al., Direct laser writing of micro-supercapacitors on hydrated graphite oxide films., Nat. Nanotechnol. 6 (2011) 496-500. doi:10.1038/nnano.2011.110.

[17] K. P. Loh, Q. Bao, G. Eda, M. Chhowalla, Graphene oxide as a chemically tunable platform for optical applications., Nat. Chem. 2 (2010) 1015-1024. doi:10.1038/nchem.907.

[18] S. J. Woltornist, A. J. Oyer, J.-M. Y. Carrillo, A. V Dobrynin, D. H. Adamson, Conductive thin films of pristine graphene by solvent interface trapping., ACS Nano. 7 (2013) 7062-6. doi:10.1021/nn402371c.

[19] S. J. Woltornist, J. M. Y. Carrillo, T. O. Xu, A. V Dobrynin, D. A. Adamson, Polymer/Pristine Graphene Based Composites: From Emulsions to Strong, Electrically Conducting Foams, Macromolecules. 48 (2015) 687-693.

[20] J. Kim, L. J. Cote, F. Kim, W. Yuan, K. R. Shull, J. Huang, Graphene oxide sheets at interfaces., J. Am. Chem. Soc. 132 (2010) 8180-6. doi:10.1021/ja102777p.

[21] J. Yan, G. Chen, J. Cao, W. Yang, B. Xie, M. Yang, Functionalized graphene oxide with ethylenediamine and 1,6-hexanediamine, New Carbon Mater. 27 (2012) 370-376. doi:10.1016/S1872-5805(12)60022-5.

[22] C. Hontoria-Lucas, a. J. Lopez-Peinado, J. d. D. Lopez-Gonzalez, M. L. Rojas-Cervantes, R. M. Martin-Aranda, Study of oxygen-containing groups in a series of graphite oxides: Physical and chemical characterization, Carbon N. Y. 33 (1995) 1585-1592. doi:10.1016/0008-6223(95)00120-3.

[23] S. Kim, S. Zhou, Y. Hu, M. Acik, Y. J. Chabal, C. Berger, et al., Room-temperature metastability of multilayer graphene oxide films., Nat. Mater. 11 (2012) 544-9. doi:10.1038/nmat3316.

[24] P. V Kumar, N. M. Bardhan, S. Tongay, J. Wu, A. M. Belcher, J. C. Grossman, Scalable enhancement of graphene oxide properties by thermally driven phase transformation., Nat. Chem. 6 (2014) 151-8. doi:10.1038/nchem.1820.

[25] I. Jung, D. a. Dikin, R. D. Piner, R. S. Ruoff, Tunable electrical conductivity of individual graphene oxide sheets reduced at "Low" temperatures, Nano Lett. 8 (2008) 4283-4287. doi:10.1021/nl8019938.

[26] A. K. Das, M. Srivastav, R. K. Layek, M. E. Uddin, D. Jung, N. H. Kim, et al., Iodide-mediated room temperature reduction of graphene oxide: a rapid chemical route for the synthesis of a bifunctional electrocatalyst, J. Mater. Chem. A. 2 (2014) 1332-1340. doi:10.1039/c3ta13688d.

[27] A. C. Ferrari, J. C. Meyer, V. Scardaci, C. Casiraghi, M. Lazzeri, F. Mauri, et al., Raman Spectrum of Graphene and Graphene Layers, Phys. Rev. Lett. 97 (2006). doi: 10.1103/PhysRevLett.97.187401.

[28] M. Acik, G. Lee, C. Mattevi, M. Chhowalla, K. Cho, Y. J. Chabal, Unusual infrared-absorption mechanism in thermally reduced graphene oxide., Nat. Mater. 9 (2010) 840-5. doi:10.1038/nmat2858.

[29] B. Rezania, N. Severin, A. V. Talyzin, J. P. Rabe, Hydration of bilayered graphene oxide, Nano Lett. 14 (2014) 3993-3998. doi:10.1021/nl5013689.

[30] J. a. Glover, D. H. Adamson, H. C. Schniepp, Charge-Driven Selective Adsorption of Sodium Dodecyl Sulfate on Graphene Oxide Visualized by Atomic Force Microscopy, J. Phys. Chem. C. 116 (2012) 20080-20085. doi: 10.1021/jp305717v.

[31] D. Krishnan, F. Kim, J. Luo, R. Cruz-Silva, L. J. Cote, H. D. Jang, et al., Energetic graphene oxide: Challenges and opportunities: "for TEM," Nano Today. 7 (2012) 137-152. doi:10.1016/j.nantod.2012.02.003.

The invention claimed is:

1. A method to fractionate and isolate components of oxidized graphene material, comprising:

a. fractionating a system that includes graphene oxide, a solvent and water, wherein the fractionation creates two phases or fractions: (i) a water phase or fraction that contains highly oxidized graphene oxide, and (ii) a solvent-in-water emulsion phase or fraction that contains a graphene-based material; and b. separating the graphene-based material from the solvent-in-water phase or fraction to recover the graphene-based material.

2. The method of claim 1, further comprising repeating the fractionating process on the solvent-in-water emulsion phase or fraction.

3. The method of claim 1, wherein the solvent is selected from the group consisting of heptane, toluene and chloroform.

4. The method of claim 1, further comprising using the graphene-based material (uGO) in an application selected from the group consisting of one or more of a medical device, a nanoelectronic, an electromechanical system, a sensor, a composite, a catalysis, and energy storage device, and an optics application.

5. A method of forming a polymer hydrogel mixture, comprising:

a. mixing DI water, Heptane, HMA, N,N'-Methylenebisacrylamide crosslinker, KPS, TEMED, and a GO or uGO fraction; and b. storing the mixture at 40 degrees Celsius overnight;

wherein an emulsion is formed that is stabilized by GO or uGO sheets.

6. The method of claim 5, wherein the GO or uGO fraction is GO.

7. The method of claim 6, wherein a GO-hydrogel is formed.

8. The method of claim 5, wherein the GO or uGO fraction is uGO.

9. The method of claim 8, wherein a uGO-hydrogel is formed.

* * * * *